United States Patent
Hill et al.

(10) Patent No.: US 10,467,226 B2
(45) Date of Patent: Nov. 5, 2019

(54) METHOD FOR IN-DATABASE FEATURE SELECTION FOR HIGH-DIMENSIONAL INPUTS

(71) Applicant: Tibco Software Inc., Palo Alto, CA (US)

(72) Inventors: Thomas Hill, Tulsa, OK (US); Vladimir S. Rastunkov, Tulsa, OK (US); George R. Butler, Tulsa, OK (US)

(73) Assignee: TIBCO SOFTWARE INC, Palo Alto, CA (US)

( * ) Notice: Subject to any disclaimer, the term of this patent is extended or adjusted under 35 U.S.C. 154(b) by 426 days.

(21) Appl. No.: 15/139,672

(22) Filed: Apr. 27, 2016

(65) Prior Publication Data
US 2017/0316050 A1    Nov. 2, 2017

(51) Int. Cl.
G06F 16/242    (2019.01)

(52) U.S. Cl.
CPC .............................. *G06F 16/2428* (2019.01)

(58) Field of Classification Search
CPC ........... G06F 17/30398; G06F 17/5045; G06F 17/30864; G06F 17/30507; G06F 17/5022; G06F 17/30592; G06F 17/30539; G06F 17/30563; G06F 16/2428; G06F 16/242; G06F 16/24; G06N 99/005
See application file for complete search history.

(56) References Cited

U.S. PATENT DOCUMENTS

| | | | |
|---|---|---|---|
| 6,055,536 A * | 4/2000 | Shimakawa | G06F 17/30864 |
| 7,383,238 B1 * | 6/2008 | Iverson | G06K 9/622 |
| | | | 382/224 |
| 9,037,464 B1 * | 5/2015 | Mikolov | G06F 17/2785 |
| | | | 704/255 |
| 2002/0013664 A1 * | 1/2002 | Strackeljan | G05B 13/027 |
| | | | 702/34 |
| 2004/0024750 A1 * | 2/2004 | Ulyanov | G06N 10/00 |
| 2004/0103108 A1 * | 5/2004 | Andreev | G06F 16/285 |
| 2005/0060325 A1 * | 3/2005 | Bakalash | G06F 17/30457 |
| 2005/0091263 A1 * | 4/2005 | Wallace | G06F 17/30398 |

(Continued)

FOREIGN PATENT DOCUMENTS

WO    WO 2016/021642 W *    3/2016    ....... G06F 17/30551

OTHER PUBLICATIONS

Hai et al., Automatic integration of Web search interfaces with WISE-Integrator, ch 25, 2004, The VLDB Journal (2004), all pages.*

(Continued)

*Primary Examiner* — Jay A Morrison
*Assistant Examiner* — Antonio J Caiado
(74) *Attorney, Agent, or Firm* — McGuireWoods LLP

(57) ABSTRACT

A system, method, and computer-readable medium for performing in-database operations, comprising: presenting an automation interface to a user, the user interface automation interface enabling a user to select one or more key performance indicators; instantiating an in-database processing operation, the in-database processing operation performing feature selection from a high dimensional parameter space; executing at least one database statement within the storage system to derive a subset of diagnostic parameters from the high dimensional parameter space.

9 Claims, 5 Drawing Sheets

(56) References Cited

U.S. PATENT DOCUMENTS

| | | | | |
|---|---|---|---|---|
| 2007/0239660 A1* | 10/2007 | Tien | ................... | G06Q 10/10 |
| 2009/0088883 A1* | 4/2009 | Baier | ................... | G06T 7/001 |
| | | | | 700/110 |
| 2009/0307032 A1* | 12/2009 | Tribe | ................ | G06Q 10/0639 |
| | | | | 705/7.38 |
| 2010/0217669 A1* | 8/2010 | Gazdzinski | ........ | G06Q 30/0251 |
| | | | | 705/14.52 |
| 2011/0161371 A1* | 6/2011 | Thomson | .......... | G06F 17/30398 |
| | | | | 707/792 |
| 2013/0013370 A1* | 1/2013 | Mithal | ................. | G06Q 10/06 |
| | | | | 705/7.27 |
| 2013/0125057 A1* | 5/2013 | Kashik | ................ | G06F 3/04815 |
| | | | | 715/852 |
| 2014/0135970 A1* | 5/2014 | Kaushal | .......... | G05B 19/41875 |
| | | | | 700/121 |
| 2014/0310285 A1* | 10/2014 | Chan | ................ | G06F 17/30598 |
| | | | | 707/740 |
| 2015/0199616 A1* | 7/2015 | Rajendraprasad | ... | G06N 99/005 |
| | | | | 706/12 |
| 2015/0254330 A1* | 9/2015 | Chan | ................. | G06F 17/30598 |
| | | | | 707/613 |
| 2015/0370882 A1* | 12/2015 | Kalki | .................... | G06F 16/283 |
| | | | | 707/600 |
| 2017/0012847 A1* | 1/2017 | Liensberger | .......... | G06F 11/323 |
| 2017/0032016 A1* | 2/2017 | Zinner | ................ | G06Q 10/063 |
| 2017/0118094 A1* | 4/2017 | Rao | ....................... | H04W 12/06 |

OTHER PUBLICATIONS

Beng et al. Fast High-Dimensional Data Search in Incomplete Databases, 1998, Proceedings of the 24th VLDB Conference, National University of Singapore, all pages.*

Christian et al., Searching in High-dimensional Spaces—Index Structures for Improving the Performance of Multimedia Databases, 2015, University of Munich, all pages.*

List of Patents or Applications Treated as Related.

* cited by examiner

METHOD FOR IN-DATABASE FEATURE SELECTION FOR HIGH-DIMENSIONAL INPUTS

BACKGROUND OF THE INVENTION

Field of the Invention

The present invention relates to information handling systems. More specifically, embodiments of the invention relate to in-database feature selection for high-dimensional inputs.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to collect and store large amounts of data. Many technologies are being developed to process large data sets (often referred to as "big data," and defined as an amount of data that is larger than what can be copied in its entirety from the storage location to another computing device for processing within time limits acceptable for timely operation of an application using the data).

In-database predictive analytics have become increasingly relevant and important to address big-data analytic problems. When the amount of data that need be processed to perform the computations required to fit a predictive model become so large that it is too time-consuming to move the data to the analytic processor or server, then the computations must be moved to the data, i.e., to the data storage server and database. Because modern big-data storage platforms typically store data across distributed nodes, the computations often must be distributed also. I.e., the computations often need be implemented in a manner that data-processing intensive computations are performed on the data at each node, so that data need not be moved to a separate computational engine or node. For example the Hadoop distributed storage framework includes well-known map-reduce implementations of many simple computational algorithms (e.g., for computing sums or other aggregate statistics).

SUMMARY OF THE INVENTION

A system, method, and computer-readable medium are disclosed for performing feature selection from high dimensional input parameter spaces in-database using common queries that can be executed in parallel in-database, to derive quickly and efficiently a subset of diagnostic parameters for predictive modeling.

In certain embodiments, the invention relates to a system, method, and computer-readable medium for performing in-database operations, comprising: presenting an automation interface to a user, the user interface automation interface enabling a user to select one or more key performance indicators; instantiating an in-database processing operation, the in-database processing operation performing feature selection from a high dimensional parameter space; executing at least one database statement within the storage system to derive a subset of diagnostic parameters from the high dimensional parameter space.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
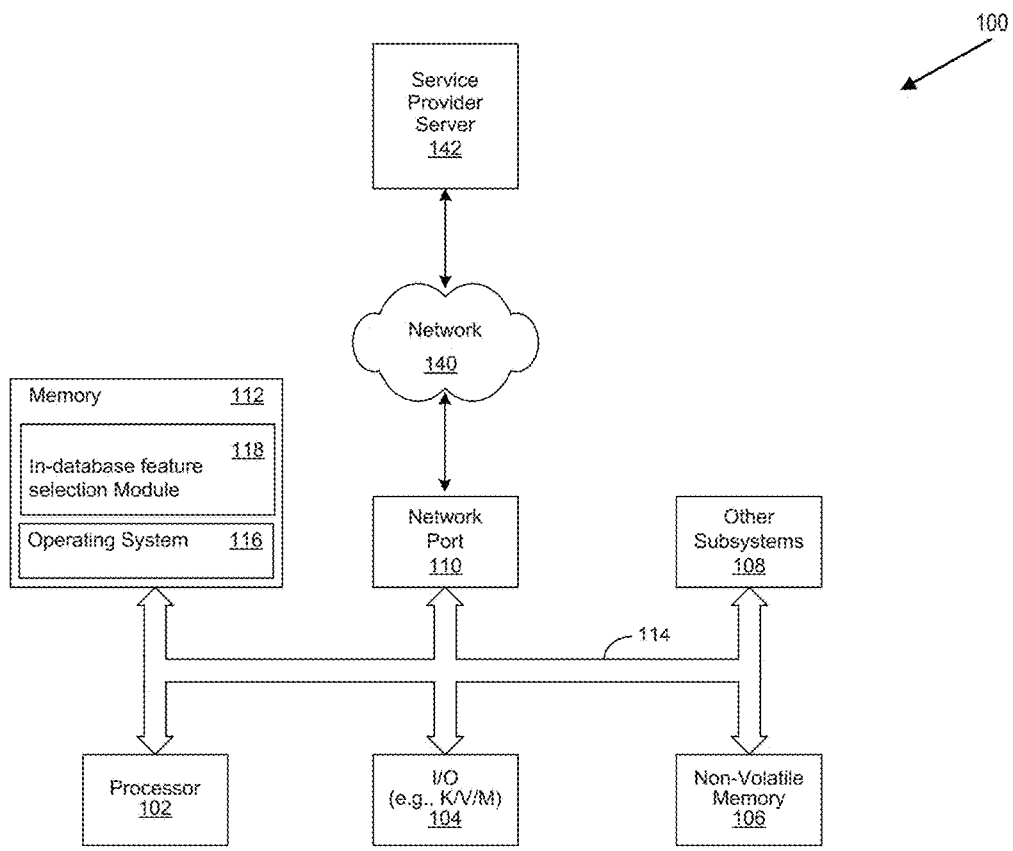
FIG. 1 shows a general illustration of components of an information handling system as implemented in the system and method of the present invention.

Aspects of the present disclosure include a recognition that a known issue in manufacturing and other domains where large numbers of parameters are collected to describe complex (manufacturing) processes is to select from among those parameters the parameters diagnostic and useful for predicting important business indicia such as key performance indicators (KPIs). For predictive modeling applications, when predicting future outcomes from large numbers of input parameters, it is often necessary to first select from among all input parameters those that are likely diagnostic and important in the predictive modeling process. This process is often referred to as feature selection.

For example, in semiconductor manufacturing, an analytic challenge is to trace quality problems observed on individual dies (i.e., chips) on wafers to the specific metrology tools and processing steps used to make the respective wafers, and lots that contain the respective wafers. This results in very high-dimensional parameter spaces, as often thousands or tens of thousands of processing steps and parameters describing those steps can be aligned with individual dies, where each parameter or combinations of parameters may be responsible for observed quality problems. Similar problems exist in other domains where detailed information regarding some process generating important business indicia are measured. For example, this issue will become increasingly ubiquitous across various domains as Internet-of-Things (IoT) technologies make ever increasing numbers of sensors and measurement parameters available for modeling and predictive analytics.

In general, feature selection algorithms consider each input parameter to a predictive modeling problem one at a time or in combination with others, and evaluate the diagnostic value (predictive power) with respect to the outcome indicia of interest. Algorithms are often selected to be fast and efficient, for example computing simple correlation coefficient, Analysis of Variance estimates, or using other methods.

Collection of such large amounts of data commonly results in big data being available for the analytic tasks. For the purposes of this disclosure big data may be defined as sufficiently large data that makes it impractical to move all data for all observed parameters from the respective storage to a computation server where all feature selection computations are performed. Accordingly, it is desirable for efficient evaluation of parameter-diagnostic values that the respective computations be performed in-database at the location where the data are stored.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise in-database feature selection module 118.

The in-database feature selection module 118 performing a feature selection operation. The feature selection operation facilitates feature selection from high dimensional input parameter spaces in-database using common queries that can be executed in parallel in-database, to derive quickly and efficiently a subset of diagnostic parameters for predictive modeling. For the purposes of this disclosure a high dimensional input parameter space may be defined as a parameter space within a database having a number of variables which is greater than can be accessed and analyzed by a single information handling system. Additionally, for the purposes of this disclosure, a parameter space may be defined as a set of combinations of values for all or a large percentage (e.g., greater than 50%) of the different parameters contained in a database.

Figure 2:
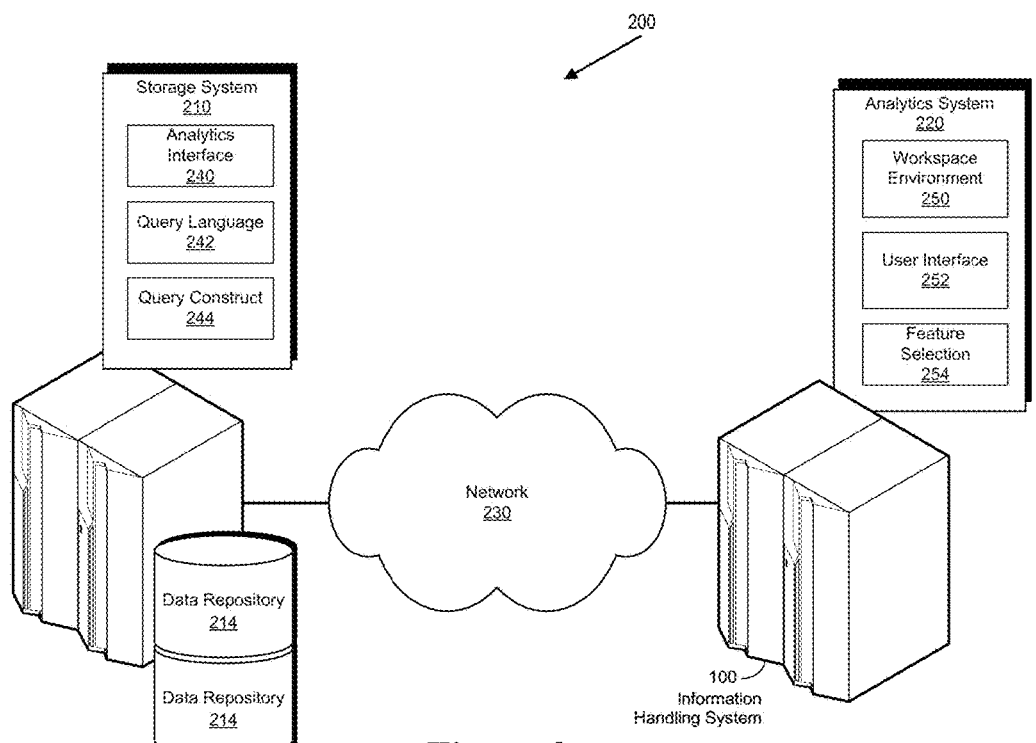
FIG. 2 shows a block diagram of an environment for virtualizing data processing for analytics and scoring.

FIG. 2 shows a simplified block diagram of a distributed analytics environment 200 in accordance with an embodiment of the invention. More specifically, the distributed analytics environment 200 includes a storage system 210 which includes one or more data repositories 214. The distributed analytics environment 200 further includes an analytics system 220 which is coupled with the storage system 210 via a network 230, which may be a private network, a public network, a local or wide area network, the Internet, combinations of the same, or the like. In various embodiments, the network 140 is included within the network 208. Either or both the storage system 210 and the analytics system 220 may reside within and execute on an information handling system 100. Portions of the storage system 210 as well as the analytics system 220 provide a query construction system, an in-database feature selection system and/or a distributed analytics system. Some or all of the functions of the in-database feature selection system and/or the distributed analytics system may be performed via the in-database feature selection module 118 and the distributed analytics module 120, respectively.

The storage system 210 is configured to perform distributed computations to derive suitable aggregate summary statistics, such as summations, multiplications, and derivation of new variables via formulae. In various embodiments, the storage system 210 comprises a SQL Server, an Oracle type storage system, an Apache Hive type storage system, an Apache Spark type storage system and/or a Teradata Server. It will be appreciated that other database platforms and systems are within the scope of the invention. It will also be appreciated that the storage system can comprise a plurality of databases which may or may not be the same type of database.

The storage system 210 includes an analytics interface 240. The storage system 210 further includes a query construction system 244. The storage system 210 executes a query language 242. The query language 242 enables the storage system 210 to initiate and control the execution of the distributed summary computations and aggregations in-database. In certain embodiments, the query language 242 is included within the analytics interface 240. In various embodiments, the query language 242 is defined by the type of storage system used and typically corresponds to one of the dialects of the SQL.

The analytics system 220 performs statistical and mathematical computations. In certain embodiments, the analytics system 220 comprises a Statistica Analytics System available from Dell, Inc. The analytics system 220 comprises a workspace environment 250, user interfaces 252 for combining aggregate statistics and numerical summaries computed by the Storage System 210 and an in-database feature selection system 254. Queries are constructed on the analytics system 220 as designed on the user interface 252 and are executed on the storage system 210. In certain embodiments, the storage system 210 may include a query optimization layer (not shown). The in-database feature selection system 254 generates in-database queries for execution by the query language 242 when performing feature selection from high dimensional input parameter spaces. The analytics system 220 further performs mathematical and statistical computations to derive final predictive models. In certain embodiments, Statistica Data Miner Workspace environment available from Dell, Inc. and the Graphical User Interface of the Statistica Data Miner Workspace are examples of the workspace environment 250 and user interfaces 252, respectively.

The workspace environment 250 provides summaries and aggregates which are computed via common queries, executed through the storage system 210, and executed via distributed query execution enabled through the capabilities of the storage system 210. For some algorithms, the execution performed on the Storage System 210 is initiated via derived variables defined through queries (e.g., coded design matrices), sums, sums of squared values, sums of squared cross-products of values, weights, numbers of observations, and other aggregate values. Additionally, in certain embodiments, the results of the execution performed on the storage system 210 are then further processed by the workspace environment 250 on the analytics system 220 to compute predictive models via multiple linear regression, general linear models, general logistic regression models, principal components analysis, cluster analyses, recursive partitioning (tree) models, and others.

Additionally, in certain embodiments, the execution performed on the storage system 210 includes performing certain computations and then creating subsamples of the results of the execution on the storage system 210. These subsamples are accessed by the workspace environment via queries subsamples of all data. The analytics system 220 can then operate on subsamples to compute (iteratively, e.g., over consecutive samples) final predictive models. Additionally, in certain embodiments, the subsamples are further processed by the workspace environment 250 on the analytics system 220 to compute predictive models including recursive partitioning models (trees, boosted trees, random forests), support vector machines, neural networks, and others.

In this process, consecutive samples may be random samples extracted at the storage system 210, or samples of consecutive observations returned by queries executing in the storage system 210. The analytics system 220 computes and refines desired coefficients for predictive models from consecutively returned samples, until the computations of consecutive samples no longer lead to modifications of those coefficients. In this manner, not all data in the storage system 210 ever needs to be processed.

The user interface 252 of the analytics system 220 provides user interface options to parameterize and optimize the computations. For example, in certain embodiments options are provided to enable simple computations on small samples extracted from the storage system 210, to derive best initial parameter estimates for any of the prediction models. The SQL query-based operation is then used to refine and finalize the model parameters. The user interface 252 also interacts with the in-database feature selection system 254 to provide in-database feature selection user interfaces. The in-database feature selection user interfaces facilitate automatic construction of queries for in database predictive analytics, especially for high dimensional input parameter spaces to derive quickly and efficiently a subset of diagnostic parameters for predictive modeling.

Accordingly, the distributed analytics environment 200 enables in-database distributed analytics to be performed in a platform-agnostic fashion. Regardless of the actual data storage system, the analytics system 220 is able to leverage all capabilities of the Storage System for distributed processing, to perform the data-processing-intensive operations of computing aggregates or samples.

The in-database feature selection system 254 provides efficient in-database computations for feature (i.e., predictor) selection. The analytics system 220 provides user and automation interfaces. The storage system 210 stores data on which the in-database computations are performed. In certain embodiments, the storage system 210 includes an ability to execute SQL or SQL-like queries to compute simple summaries for selected data fields, or selected portions of data fields. In certain embodiments, the simple summaries include for example counts, sums, averages and standard deviations. In certain embodiments the selected data fields or selected portions of data fields are defined by statements such as Select, Where and Group By statements.

In certain embodiments, the user interface 252 of the analytics system 220 presents an automation interface. In certain embodiments, the automation interface enables users to select candidate parameters and/or features from a list of available parameters in a respective data repository.

If a respective data repository of the storage system 210 represents a relational database and the parameters and parameter values are stored in stacked format in a single table, then the user can select from among the Parameter Names in the stacked table. In certain embodiments, the single table includes one or more of Parameter Names, date/time-stamps or other index values. In certain embodiments, a database view of the data repository into multiple tables databases is organized to mimic a stacked format in a single table. If parameter values are stored or organized as columns, then the user can select from among all the field names. In certain embodiments, each data field or column represents the values for a single parameter. When selecting a particular column, the in-database feature selection system 254 performs computational operations which automatically determine if the selected parameters (e.g., the Parameter Names) contain discrete values such as tool names or continuous measurements such as tool or sensor measurements.

In certain embodiments, the automation interface presented by the user interface 252 enables a user to select one or more key performance indicators. In certain embodiments, the analytics system 220 provides a feature selection option which is performed separately for each selected key performance indicator. In certain embodiments, similar options are available for supporting stacked as well as flat-file data tables, and discrete or continuous KPI measurements.

The analytics system 220 automatically generates queries to perform the desired computations for linear and nonlinear feature selection, for each selected parameter and for each KPI. For example, for linear feature selection operations, the queries request computation of in-database sums, sums-of-squares and cross-products to compute Correlations or ANOVA (Analysis of Variance) measurements (effect size, F-values, values) with respect to each selected parameter and each selected KPI. For nonlinear feature selection, the queries request computation of optimal splits in each selected parameter. The optimal splits in each selected parameter will provide an improved relationship between the rank-ordered or discrete parameters and each selected KPI. In certain embodiments, the automatically generated queries perform Chi-Squared Automatic Interaction Detection (CHAID) type operations. In certain embodiments the automatically generated queries perform one or more operation that result in an index of lift or diagnostic value to identify the specific parameters showing the strongest relationship to the respective KPI's. The term lift in the context of predictive modeling refers to the improvement in the accuracy of a predictive model that is attributable to a particular parameter relative to the improvement in accuracy that can be expected by pure chance if a parameter (i.e., a variable) with random values were to be added to the prediction equations. In certain embodiments the analytics system 220 includes capabilities to prepare queries that explicitly evaluate interaction effects between pairs or triplets of selected parameters. For the purposes of this disclosure, interactions imply summary statistics that reflect on the joint importance of pairs or triplets of parameters that are present only when each of the respective parameters is present in a particular prediction model.

The queries prepared by the analytics system 220 are then be submitted to the storage system 210. When submitting the queries, the analytics system 220 is aware of the capabilities of the storage system 210 with respect to the ability of the storage system 210 to execute queries in parallel. Thus, the analytics system 210 maximizes the computation performance of the distributed analytics environment 200 given available hardware and resources.

After all queries have completed and returned the respective summary statistics (typically one statistic per parameter), the analytics system 210 then prepare a final result for each KPI, showing the set of parameters chosen from among all parameters that show the strongest relationship (linear, non-linear) to each selected KPI. In certain embodiments, the analytics system 210 prepare one or more diagnostic statistics and graphical displays to aid in the interpretation of results and subsequent post-processing and modeling of selected predictors. For example, in certain embodiments, the analytics system 210 prepares a Pareto chart which represents in a bar chart a bar for each parameter, where the length of the bar is proportional to the respective parameter's strength-of-relationship to the respective KPI.

The distributed analytics environment 200 is implemented, without requiring deployment of storage system specific agents or computer code, against many different data storage systems; including all standard databases, Hadoop type storage systems or Spark via Hive (and HiveQL), or to emerging appliances such as Microsoft APS. The analytics system 220 and workspace environment 250 are agnostic with respect to the actual storage systems in use, and hence capable of supporting hybrid environments. Such a distributed analytics system would be much easier to deploy, maintain, and scale.

In various embodiments, the network 230 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Figure 3:
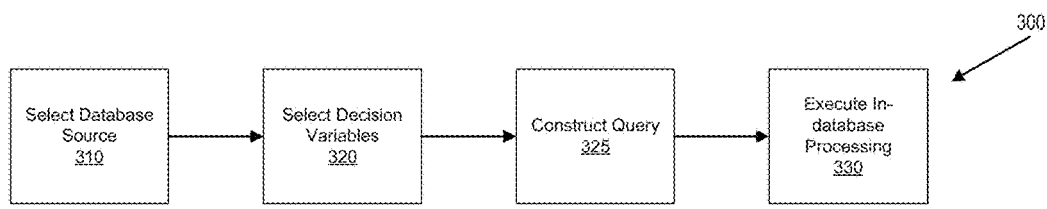
FIG. 3 shows a flow diagram of an end-user perspective of in-database processing operation.

FIG. 3 shows a flow diagram of an end-user perspective of in-database processing operation. More specifically, when performing an in-database processing operation 300, the user selects a database source at step 310. The database source can be any compliant database. For the purposes of the present disclosure, a compliant database comprises a database which has corresponds to the open database connectivity (ODBC) or open link and embedding database (OLE DB) database standards with SQL dialect or a database which supports a functionally comparative formal query language allowing the database to perform distributed computations. Examples of compliant databases include the Microsoft SQL Server database, Microsoft SQL Server Parallel Distributed Warehouse (PDW) database, Oracle database, Teradata database, Apache Hive database, My SQL database, and IBM Netezza database.

Next, the user selects decision variables via a query user interface at step 320. When selecting the decision variables, a database table description is acquired, e.g., via the workspace environment 250 of the analytics system 220. Next, at step 325 in-database feature selection system 254 automatically constructs the query based upon the selected decision variables. Next, at step 330, the in-database processing is executed by the storage system 210. When executing the in-database processing, only the final results of the execution are extracted by the analytics system 220.

The in-database processing operation empowers analysis with an in-database processing capabilities while only needing a few steps to configure the processing. Additionally, by providing an in-database analysis user interface within the analytics system 220, the in-database processing capabilities can be configured with no knowledge of SQL, programming or database configuration in general. Additionally, all of the performance intensive computations are executed on the database side of the environment, significantly reducing the amount of data that needs to be provided from the database to the analytics system 220.

Figure 4:
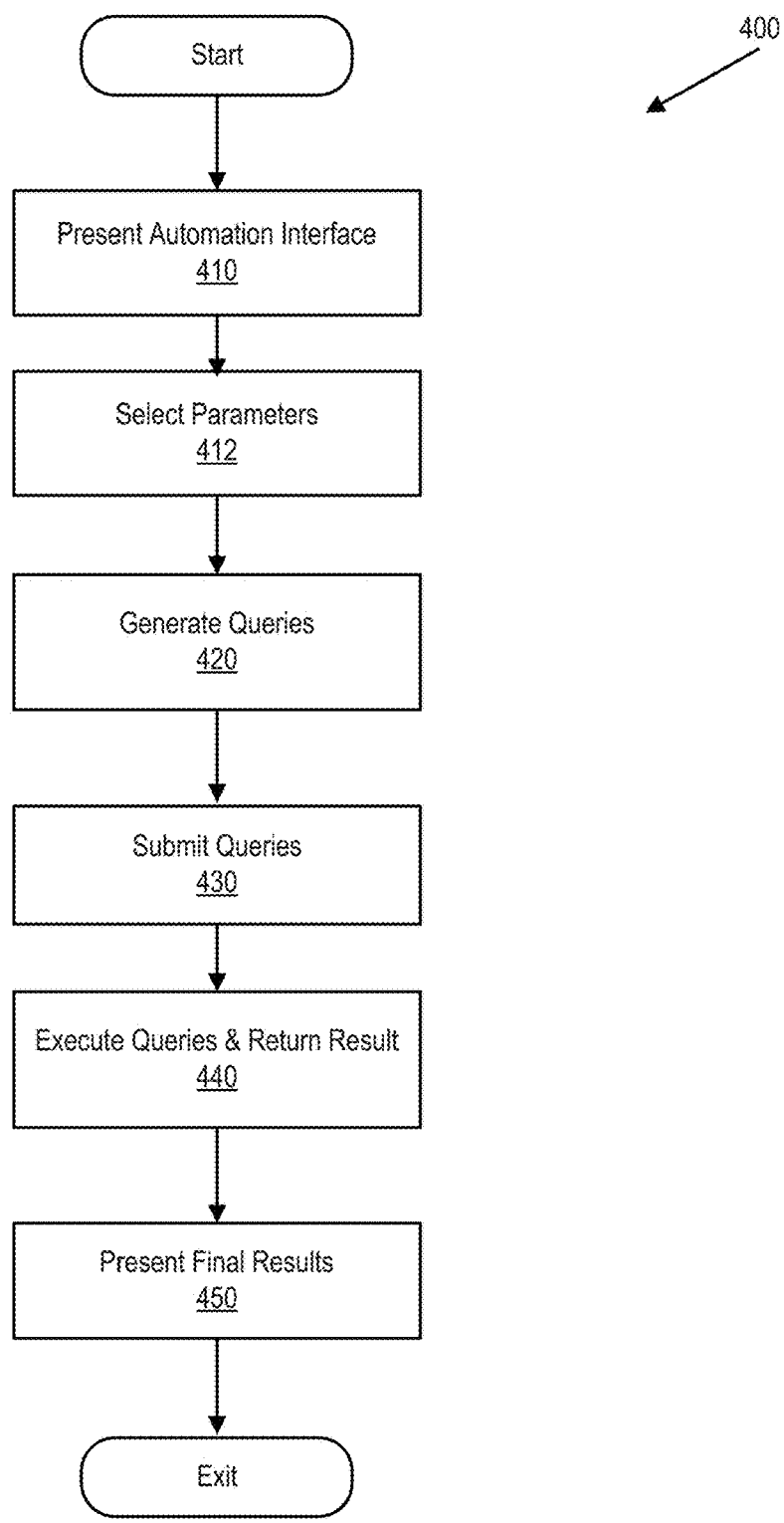
FIG. 4 shows a flow chart of a feature selection operation.

Referring to FIG. 4, a flow chart of a feature selection operation 400 is shown. More specifically, the feature selection operation begins at step 410 by presenting an automation interface. In certain embodiments, the automation interface presents a list of available parameters. Next, at step 412, a user selects candidate parameters and/or features from a list of available parameters in a respective data repository.

If a respective data repository of the storage system 210 represents a relational database and the parameters and parameter values are stored in stacked format in a single table, then the user can select from among the Parameter Names in the stacked table. In certain embodiments, the single table includes one or more of Parameter Names, date/time-stamps or other index values. In certain embodiments, a database view of the data repository into multiple table databases is organized to mimic a stacked format in a single table. If parameter values are stored or organized as columns, then the user can select from among all the field names. In certain embodiments, each data field or column represents the values for a single parameter. When selecting a particular column, the in-database feature selection system 254 performs computational operations which automatically determine if the selected parameters (e.g., the Parameter Names) contain discrete values such as tool names or continuous measurements such as tool or sensor measurements.

In certain embodiments, the automation interface presented by the user interface 252 enables a user to select one or more key performance indicators. In certain embodiments, the analytics system 220 provides a feature selection option which is performed separately for each selected key performance indicator. In certain embodiments, similar options are available for supporting stacked as well as flat-file data tables, and discrete or continuous KPI measurements.

Next, at step 420, the analytics system 220 automatically generates queries to perform the desired computations for linear and nonlinear feature selection, for each selected parameter and for each KPI. For example, for linear feature selection operations, the queries request computation of in-database sums, sums-of-squares and cross-products to compute Correlations or ANOVA (Analysis of Variance) measurements (effect size, F-values, pvalues) with respect to each selected parameter and each selected KPI. For nonlinear feature selection, the queries request computation of optimal splits in each selected parameter. The optimal splits in each selected parameter will provide an improved relationship between the rank-ordered or discrete parameters and each selected KPI. In certain embodiments, the automatically generated queries perform Chi-Squared Automatic Interaction Detection (CHAID) type operations. In certain embodiments the automatically generated queries perform one or more operation that result in an index of lift or diagnostic value to identify the specific parameters showing the strongest relationship to the respective KPI's. In certain embodiments the analytics system 220 includes capabilities to prepare queries that explicitly evaluate interaction effects between pairs or triplets of selected parameters. For the purposes of this disclosure, interactions imply summary statistics that reflect on the joint importance of pairs or triplets of parameters that are present only when each of the respective parameters is present in a particular prediction model.

Next, at step 430, the queries prepared by the analytics system 220 are then submitted to the storage system 210. When submitting the queries, the analytics system 220 is aware of the capabilities of the storage system 210 with respect to the ability of the storage system 210 to execute queries in parallel. Thus, the analytics system 210 maximizes the computation performance of the distributed analytics environment 200 given available hardware and resources. At step 440, the storage system 210 completes execution of the queries and returns the results of the queries. In certain embodiments, the results include respective summary information relating to the queries.

Next, at step 450, after all queries have completed and returned the respective summary statistics (typically one statistic per parameter), the analytics system 210 then prepare a final result for each KPI, showing the set of parameters chosen from among all parameters that show the strongest relationship (linear, non-linear) to each selected KPI. In certain embodiments, the analytics system 210 prepare one or more diagnostic statistics and graphical displays to aid in the interpretation of results and subsequent post-processing and modeling of selected predictors. For example, in certain embodiments, the analytics system 210 prepares a Pareto chart which represents in a bar chart a bar for each parameter, where the length of the bar is proportional to the respective parameter's strength-of-relationship to the respective KN.

Figure 5:
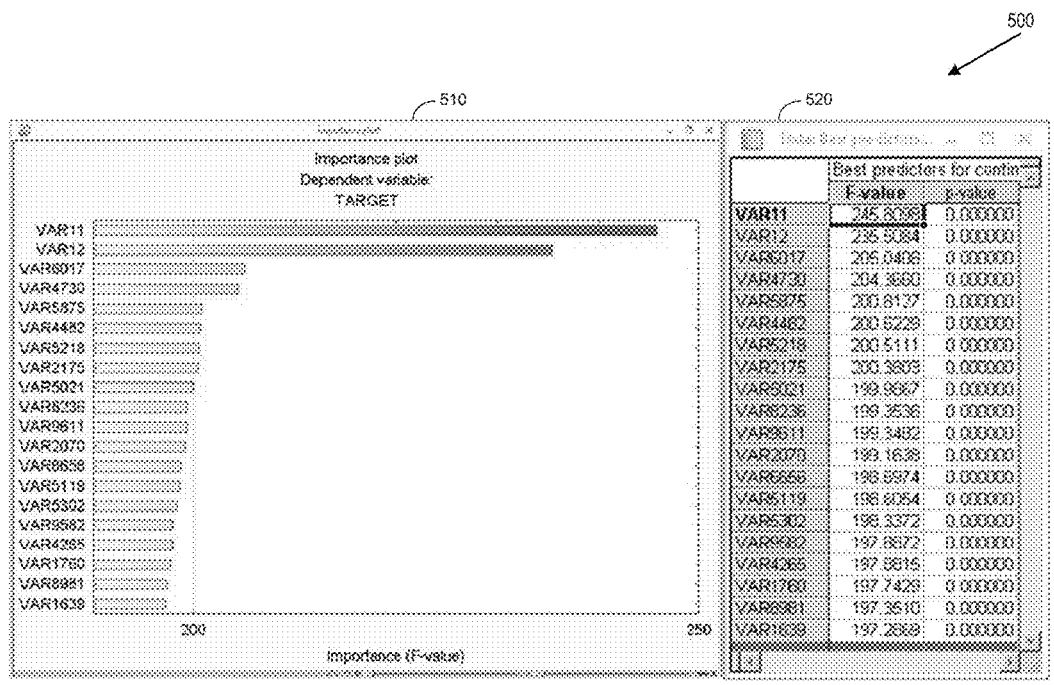
FIG. 5 shows an implementation representation of results of a feature selection operation.

Referring to FIG. 5, an example of a user interface 500 of an implementation representation of results of a feature selection operation is shown. More specifically, the user interface includes a feature selection importance plot portion 510 representing certain dependent variables as well as a feature selection data portion 520 presenting results associated with certain variables identified when performing a feature selection operation.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that the high dimensional input parameter spaces in-database using common queries that can be executed in parallel in-database, to derive quickly and efficiently a subset of diagnostic parameters for predictive modeling can be especially useful in large data structures such as data structures having thousands and even tens of thousands of columns of data. Examples of such large data structures can include data structures associated with manufacturing of complex products such as semiconductors, data structures associated with text mining such as may be used when performing warranty claims analytics as well as when attempting to red flag variables in data structures having a large dictionary of terms. Other examples can include marketing data from data aggregators as well as data generated from social media analysis. Such social media analysis data can have many varied uses such when performing risk management associated with health care or when attempting to minimize risks of readmission to hospitals due to a patient not following an appropriate post-surgical protocol.

Consequently, the invention is intended to be limited only by the spirit and scope of the appended claims, giving full cognizance to equivalents in all respects.

What is claimed is:

1. A computer-implementable method for performing in-database operations on parameters associated with complex manufacturing processes, comprising:
presenting an automation interface to a user, the automation interface enabling a user to select one or more key performance indicators;
instantiating an in-database processing operation, the in-database processing operation performing feature selection from a high dimensional parameter space, wherein database statements are executed in parallel to derive a subset of diagnostic parameters from the high dimensional parameter space; and
displaying results showing the subset of diagnostic parameters and strength of relationship to the one or more key performance indicators;
wherein the in-database processing operation performing feature selection comprises:
determining one or more key performance indicators containing at least one of discrete values and continuous measurements; and
constructing the database statements using a common query language and capabilities of a storage system;
wherein the discrete values and continuous measurements trace quality issues associated with the complex manufacturing process;
wherein deriving the subset of diagnostic parameters comprises performing a feature selection operation for each of a plurality of selected parameters;
wherein the feature selection operation comprises linear feature selection operations and nonlinear feature selection operations;
wherein the linear feature selection operations and the nonlinear feature selection operations are performed for the discrete values and continuous measurements.

2. The method of claim 1, further comprising:
distributing the at least one database statement across a plurality of nodes of the storage system; and,
executing the at least one database statement at each of the plurality of nodes of the storage system.

3. The method of claim 1, wherein:
deriving the subset of diagnostic parameters comprises performing a feature selection operation for each of a plurality of key performance indicators.

4. A system comprising for performing in-database operations on parameters associated with complex manufacturing processes:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
presenting an automation interface to a user, the automation interface enabling a user to select one or more key performance indicators;
instantiating an in-database processing operation, the in-database processing operation performing feature selection from a high dimensional parameter space, wherein
database statements are executed in parallel to derive a subset of diagnostic parameters from the high dimensional parameter space; and
displaying results showing the subset of diagnostic parameters and strength of relationship to the one or more key performance indicators;
wherein the in-database processing operation performing feature selection comprises:
determining one or more key performance indicators containing at least one of discrete values and continuous measurements; and
constructing the database statements using a common query language and capabilities of a storage system;
wherein the discrete values and continuous measurements to trace quality issues associated with the complex manufacturing process;
wherein deriving the subset of diagnostic parameters comprises performing a feature selection operation for each of a plurality of selected parameters,
wherein the feature selection operation comprises linear feature selection operations and nonlinear feature selection operations;
wherein the linear feature selection operations and the nonlinear feature selection operations are performed for the discrete values and continuous measurements.

5. The system of claim 4, wherein the instructions are further configured for:
distributing the at least one database statement across a plurality of nodes of the storage system; and, executing the at least one database statement at each of the plurality of nodes of the storage system.

6. The system of claim 4, wherein:
deriving the subset of diagnostic parameters comprises performing a feature selection operation for each of a plurality of key performance indicators.

7. A non-transitory, computer-readable storage medium embodying computer program code for performing in-database operations on parameters associated with complex manufacturing processes, the computer program code comprising computer executable instructions configured for:
presenting an automation interface to a user, automation interface enabling a user to select one or more key performance indicators;
instantiating an in-database processing operation, the in-database processing operation performing feature selection from a high dimensional parameter space, wherein
database statements are executed in parallel to derive a subset of diagnostic parameters from the high dimensional parameter space; and
displaying results showing the subset of diagnostic parameters and strength of relationship to the one or more key performance indicators;
wherein the in-database processing operation performing feature selection comprises:
determining one or more key performance indicators containing at least one of discrete values and continuous measurements; and
constructing the database statements using a common query language and capabilities of a storage system;
wherein the discrete values and continuous measurements trace quality issues associated with the complex manufacturing process;
wherein deriving the subset of diagnostic parameters comprises performing a feature selection operation for each of a plurality of selected parameters;
wherein the feature selection operation comprises linear feature selection operations and nonlinear feature selection operations;
wherein the linear feature selection operations and the nonlinear feature selection operations are performed for the discrete values and continuous measurements.

8. The non-transitory, computer-readable storage medium of claim 7, wherein the instructions are further configured for:
distributing the at least one database statement across a plurality of nodes of the storage system; and,
executing the at least one database statement at each of the plurality of nodes of the storage system.

9. The non-transitory, computer-readable storage medium of claim 7, wherein:
deriving the subset of diagnostic parameters comprises performing a feature selection operation for each of a plurality of key performance indicators.

* * * * *